(12) United States Patent
Safreed et al.

(10) Patent No.: US 9,478,033 B1
(45) Date of Patent: Oct. 25, 2016

(54) PARTICLE-BASED TRACKING OF OBJECTS WITHIN IMAGES

(75) Inventors: Sean Safreed, San Francisco, CA (US); Stu Maschwitz, San Francisco, CA (US); Stonewall Ballard, Concord, MA (US)

(73) Assignee: Red Giant Software, Beaverton, OR (US)

( * ) Notice: Subject to any disclaimer, the term of this patent is extended or adjusted under 35 U.S.C. 154(b) by 1538 days.

(21) Appl. No.: 12/848,653

(22) Filed: Aug. 2, 2010

(51) Int. Cl.
  G06K 9/00  (2006.01)
  G06T 7/00  (2006.01)
  G06T 7/20  (2006.01)
  H04N 19/54  (2014.01)

(52) U.S. Cl.
  CPC ......... *G06T 7/0042* (2013.01); *G06K 9/00744* (2013.01); *G06T 7/2033* (2013.01); *G06T 2207/10016* (2013.01); *H04N 19/54* (2014.11)

(58) Field of Classification Search
  None
  See application file for complete search history.

(56) References Cited

U.S. PATENT DOCUMENTS

| | | | |
|---|---|---|---|
| 5,936,671 A | 8/1999 | Van Beek et al. | |
| 5,982,909 A * | 11/1999 | Erdem et al. | 382/103 |
| 7,372,472 B1 | 5/2008 | Bordeleau et al. | |

OTHER PUBLICATIONS

Toklu et al., "Semi-automatic video object segmentation in the presence of occlusion", Jun. 2000, IEEE Transactions on Circuits and Systems for Video Technology, vol. 10, iss. 4, p. 624-629.*
Toklu et al., "Two-dimensional triangular mesh-based mosaicking for object tracking in the presence of occlusion", Jan. 10, 1997, Proc. SPIE, Visual Communications and Image Processing '97, vol. 3024, p. 328-337.*
Toklu et al., "Tracking Motion and Intensity Variations Using Hierarchical 2-D Mesh Modeling for Synthetic Object Transfiguration", Nov. 1996, Graphical Models and Image Processing, vol. 58, No. 6, p. 553-573.*
Jain et al., "Non-Rigid Spectral Correspondence of Triangle Meshes", Apr. 5, 2007, International Journal of Shape Modeling, p. 1-24.*
Toklu et al., "2-D mesh-based tracking of deformable objects with occlusion", Sep. 19, 1996, Proceedings of International Conference on Image Processing, 1996, vol. 1, p. 933-936.*
Zhao et al., "An object tracking algorithm based on occlusion mesh model", 2002, Proceedings of International Conference on Machine Learning and Cybernetics, 2002, vol. 1, p. 288-292.*
Altunbasak et al., "Occlusion-adaptive 2-D mesh tracking", May 10, 1996, Conference Proceedings ICASSP-96, vol. 4, p. 2108-2111.*
Tekalp et al., "Face and 2-D mesh animation in MPEG-4", Jan. 2000, Signal Processing: Image Communication, vol. 15, iss. 4-5, p. 387-421.*
Shewchuk, "Triangle: Engineering a 2D quality mesh generator and Delaunay triangulator", 1996, Applied Computational Geometry towards Geometric Engineering Lecture Notes in Computer Science, 1996, vol. 1148, p. 203-222.*
Jean-Yves Bouguet. "Pyramidal Implementation of the Lucas Kanade Feature Tracker Description of the Algorithm." Intel Corporation Microprocessor Research Labs.

* cited by examiner

Primary Examiner — Stephen R Koziol
Assistant Examiner — Timothy Choi
(74) Attorney, Agent, or Firm — Crawford Maunu PLLC

(57) ABSTRACT

Objects are tracked within images. According to an example embodiment, video data is processed for tracking one or more objects. A computer circuit executes instructions to process a series of ordered video frames in a set of video data as follows. A region of interest is defined in an initial one of the video frames, and a particle mesh is formed from a set of feature points for an object in the defined region. The particle mesh is propagated to an adjacent video frame using motion vectors of points in the mesh to form a coarse boundary at the adjacent frame. Occlusion and scene boundaries are detected in the adjacent video frame, and the detected boundaries are used to set a boundary and a number of feature points within the boundary in the adjacent video frame to maintain mesh coherence and track the object in the subsequent video frames.

21 Claims, 3 Drawing Sheets

PARTICLE-BASED TRACKING OF OBJECTS WITHIN IMAGES

FIELD

The present invention relates generally to image and video data processing, and more specifically to tracking objects in videos.

BACKGROUND

Image and video data processing and manipulation have become increasingly challenging as the quality and volume of data have correspondingly increased, and further as the demand for accurate, presentable image and video has similarly increased. To this end, a wide variety of image sequence processing and analysis tasks have involved object-based video manipulation. However, many video objects, such as a person's face, a vehicle, or other objects in a scene may be only partially visible in respective frames in an image sequence. For example, scene boundaries, or occlusion by another video object and other image characteristics can create visibility issues.

Many approaches to processing image and video data have involved tracking objects in two-dimensional (2D) images, using a tracking algorithm-type approach to analyze video frames in order to estimate motion parameters and to follow an object's motion path. Such applications have involved both model-based features such as wire frame features, as well as region-based features such as points of interest on a calculated surface, region or active contours.

Despite these attempts at tracking objects, it has been difficult to associate target locations in consecutive video frames, especially when the objects are moving fast relative to the frame rate, are occluded, or move off the scene. In addition, many approaches to tracking objects have been limited in their capabilities, and often limited to tracking objects between frames (e.g., tracking frame-to-frame motion of a video object for video-object compression). These and other matters have posed challenges to processing image and video data.

SUMMARY

The present invention is directed to methods and systems for tracking objects within a scene or flow of visual images, in a manner that addresses challenges such as those discussed in the Background above. These and other aspects of the present invention are exemplified in a number of example embodiments, some of which are shown in the figures and characterized in the claims section that follows.

According to an example embodiment, a system for processing video data includes a computer circuit configured to process a series of sequentially-ordered video frames in a set of video data. The computer circuit defines a region of interest in an initial one of the video frames, and generates a particle mesh from a set of feature points for an object in the defined region. The computer circuit propagates the particle mesh to an adjacent video frame using motion vectors of points in the mesh to determine a coarse boundary at the adjacent frame, and detects a condition of occlusion and scene boundaries in the adjacent video frame based upon the position of the determined coarse boundary. The computer circuit further uses the detected condition of occlusion and scene boundaries to set a boundary and a number of feature points within the coarse boundary in the adjacent video frame, to maintain mesh coherence and track the object in the adjacent video frame.

Another example embodiment is directed to a system for tracking objects in a series of video frames. The system includes a user interface circuit and a computer circuit. The user interface circuit is configured to receive user inputs for defining a region of interest in an image represented by a first one of the video frames. The computer circuit is configured to generate a particle mesh from a set of feature points for the defined region of interest in the first one of the video frames, calculate a transformation function for propagating the mesh to a temporally-adjacent one of the video frames using motion vectors for the feature points, and propagate the particle mesh from the first video frame to the temporally-adjacent video frame. For each subsequent pair of temporally-adjacent video frames, the computer circuit is configured to use a transformation function calculated for a temporally-previous pair of video frames to propagate a particle mesh from a first one of the pair of video frames to a second one of the pair of video frames, and calculate a transformation function for propagating the mesh from the first one of the pair of video frames to the second one of the pair of video frames. The computer circuit further tests the propagated mesh for coherence based upon the number of the feature points maintained in the propagated mesh throughout each video frame, and, in response to determining that the propagated mesh is coherent, uses the propagated mesh to apply a video effect to video data in a region defined by the mesh in each of the video frames.

Another example embodiment is directed to a system for tracking objects in a series of video frames. The system includes a user interface circuit to receive user inputs and a computer circuit for tracking the objects. The user interface circuit is configured to receive the user inputs for defining a region of interest in first and last keyframe images in the series of video frames. The computer circuit is configured, for each of the first and last keyframe images, to form a particle mesh from a set of feature points for the defined region of interest, calculate a transformation function for propagating the mesh to a temporally-adjacent one of the video frames using motion vectors for the feature points, and propagate the particle mesh from the keyframe images to the temporally-adjacent video frame. For subsequent pairs of temporally-adjacent video frames in a temporal direction towards the other of the first and last keyframe images, the computer circuit uses a transformation function calculated for a temporally-previous pair of video frames to propagate a particle mesh from a first one of the pair of video frames to a second one of the pair of video frames, and calculates a transformation function for propagating the mesh from the first one of the pair of video frames to the second one of the pair of video frames. The computer circuit further combines the propagated particle mesh for the video frames generated from each of the keyframe images, and tests the combined propagated mesh for coherence based upon the number of the feature points maintained in the propagated mesh throughout each video frame. In response to determining that the combined propagated mesh is coherent, the computer circuit uses the propagated mesh to apply a video effect to video data in a region defined by the mesh in each of the video frames, by modifying the video data to which the video effect is to be applied.

Another example embodiment is directed to a method for processing video data. The method includes processing a series of sequentially-ordered video frames (in a set of video data) in a computer circuit as follows. A region of interest is defined in an initial one of the video frames, and a particle mesh is generated from a set of feature points for an object in the defined region. The particle mesh is propagated to an adjacent video frame using motion vectors of points in the mesh to determine a coarse boundary at the adjacent frame, and a condition of occlusion and scene boundaries are detected in the adjacent video frame based upon the position of the determined coarse boundary. The detected condition of occlusion and scene boundaries is used to set a boundary and a number of feature points within the coarse boundary in the adjacent video frame, to maintain mesh coherence and track the object in the adjacent video frame.

Another example embodiment is directed to a non-transitory computer readable medium including program instructions that, when executed by a computer processor, cause the processor to process a series of sequentially-ordered video frames in a set of video data, by performing the following steps. A region of interest is defined in an initial one of the video frames, and a particle mesh is generated from a set of feature points for an object in the defined region. The generated particle mesh is transformed by propagating the particle mesh to an adjacent video frame using motion vectors of points in the mesh to determine a coarse boundary at the adjacent frame (e.g., such transformation transforms an image corresponding to the mesh in one frame, to an image corresponding to the mesh in another frame). A condition of occlusion and scene boundaries in the adjacent video frame is detected based upon the position of the determined coarse boundary. The detected condition of occlusion and scene boundaries is then used to set a boundary and a number of feature points within the coarse boundary in the adjacent video frame, to maintain mesh coherence and track the object in the adjacent video frame.

Various example embodiments are directed to a tracking system having several sub-systems for tracking objects within a scene or flow of visual images.

Another example embodiment is directed to particle-based tracking of objects within a flow of visual images for defining objects in those images.

Another example embodiment is directed to particle-based tracking of objects within a flow of visual images, where one or more of the objects change over time.

Another example embodiment is directed to particle-based tracking of objects within a flow of visual images that is bi-directional in time.

Another example embodiment is directed to particle-based tracking of objects within a flow of visual images that is resilient in its ability adaptively reset itself to maintain tracking, if object coherence is lost.

Another example embodiment is directed to particle-based tracking of objects within a flow of visual images that is resilient in its ability to track an object as it becomes occluded by another object.

Another example embodiment is directed to particle-based tracking of objects within a flow of visual images that is resilient in its ability to track an object within a scene as it moves off and back into a scene.

The above summary is not intended to describe each illustrated embodiment or every implementation of the present invention. The figures and detailed description that follow, as well as the claims, more particularly exemplify these embodiments.

BRIEF DESCRIPTION OF THE DRAWINGS

The invention may be more completely understood in consideration of the detailed description of various embodiments of the invention that follows in connection with the accompanying drawings as follows.

Figure 1:
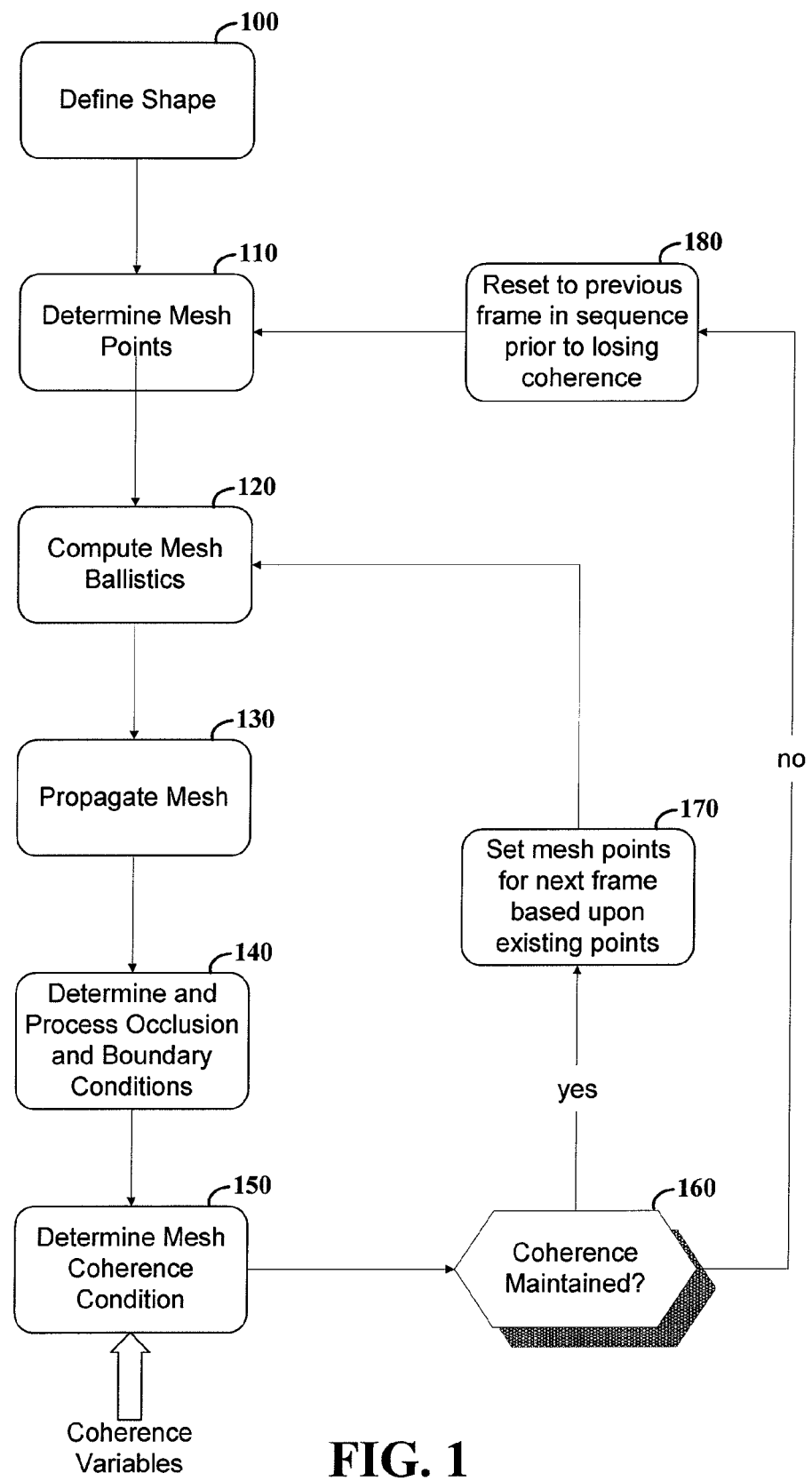
FIG. 1 shows a block diagram for particle-based tracking, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present invention are believed to be useful for tracking objects in a scene or flow of visual images. A particular application of the present invention relates to tracking objects in video as the objects move or otherwise change in subsequent images in the video. While the present invention is not necessarily limited to such applications, various aspects of the invention may be appreciated through a discussion of various examples using this context.

The following discussion characterizes object tracking in accordance with one or more example embodiments, involving shape definition, mesh point and ballistics determination, occlusion and scene boundary management, and the determination of frame-to-frame mesh coherence. These and other example embodiments are implemented using a variety of systems, which may include one or more of a software-programmed computer or computer arrangement, programmable circuits, logic circuits, and others. Various embodiments are directed to computer-executable functions such as software-based modules that, when executed by a logic circuit (e.g., a computer), cause the computer or logic circuit to carry out the various functions discussed, and related transformation(s) of data. Such transformations may involve, for example, transforming an input image mesh into an output image frame by tracking mesh points between frames and including or excluding pixels or other image data in the output frame.

In connection with various example embodiments, a combination of edge location, frame-to-frame mesh coherence and point cloud fitting is used to track objects in a series of video frames. At an initial frame, points that are trackable are determined based upon one or more of a variety of factors, such as by the edge locations of the points. In each subsequent frame, a determination is made as to whether the points continue to be consistent. Certain points may be removed, or additional points may be added, based upon conditions of the video being processed.

An object to be tracked is identified using a shape definition operation, using a representation of a vector or orientation of the object (e.g., an arrow or other directional indicator that represents the direction of the vector or orientation). Such shapes may, for example, be a set shape such as an oval, circle, rectangle or oblate ellipse, or may be a defined shape such as a complex dynamic mask or an arbitrary shape. Individual points that represent features of interest can be selected, changed or de-selected as part of a shape definition process.

In various embodiments, object definition data is provided as an input, either manually or automatically, to set an object or group of objects in a video frame to be tracked. For instance, an individual may manually input or otherwise select an object in a video frame using an interactive device in connection with a computer display, which in turn identifies a region or other type of portion of video image that defines the selected object. In other embodiments, one or more objects in a video scene are actively identified, such as by using an object recognition-type of approach (e.g., a software-programmed computer that executes functions to identify objects in a scene). These manually-defined or automatically-defined objects may, for example, relate to and/or include objects such as an individual's face, a vehicle, a building, a projectile or one of a multitude of disparate objects to be tracked from frame to frame.

Trackable mesh points, such as features or other regions within a shape, are set or determined using one or more of a variety of approaches. Generally, such points are set relative to an image feature that can be identified from frame to frame, such as the features of a person's face or the outline of an object that tend to be visible and remain relatively constant between frames. For smooth objects, outside edges or edges relative to background images may be used to define a region of points for tracking. In many applications, various heuristics are used to set a number of points to use for a particular frame, either automatically or via human involvement. Contrast, size, shape, consistency and other factors may be used in connection with such a determination.

In one implementation, a combination of edge location and frame-to-frame mesh coherence characteristics are used within a point-cloud fitting system to define trackable mesh points. For instance, using a scene including a person's face as an example, edge locations of the face may be identified relative to other shapes in the scene, and the face can often be readily tracked from video frame to video frame where the overall set of points used to define the face remains generally coherent. These points effectively represent a point-cloud, to which a mesh characterizing the person's face can be fit.

The determined points are weighted as a function of distance from the center and toward the edge of the shape. A sufficient number of mesh points are used to maintain consistency, and can vary dynamically over time in order to maintain coherence. In these contexts, a sufficient number of mesh points may be defined, for example, as a number of mesh points that permit coherent tracking of an object from frame to frame, or that permit such tracking through a predefined number of frames. Accordingly, a number of mesh points determined to be sufficient may be set for each specific application, which may vary according to a variety of conditions such as motion in a particular scene, or to the resolution or accuracy desired for tracking functions. For instance, the number of mesh points may be set based upon the value of motion vectors assigned to each mesh point and/or to an entire object.

In some implementations, trackable points in each frame are identified by edge locations of the points. Where a previous frame is present, as would correspond to any video frame after a first frame in the video, trackable points identified in a previous frame are re-used in a current frame. For example, if trackable points identified in a previous frame are consistent, those points can be re-used; however, if previously-identified points are not consistent, or perhaps not visible, those points may be discarded.

The number of points in each frame also varies depending upon the application, with fewer or more points included as desired or otherwise useful. For example, the number of mesh points in a frame may be increased relative to the number of mesh points in a previous frame if useful to maintain coherence. Similarly, the number of mesh points in a frame may be reduced relative to the mesh points in a previous frame where sufficient coherence can be maintained with fewer points (e.g., to reduce processing burden).

In connection with various embodiments, data characterizing mesh points such as those discussed above is augmented with frame-to-frame directionality data that is used in tracking objects. The directionality data may, for example, include one or more of frame-to-frame obstacle flow data or vector directionality of the mesh points. This augmented data is used to identify frame-to-frame movement of the mesh points (or corresponding features) within a scene. Such definition is applicable, for example, to determining or otherwise defining a transformation function that transforms a set of mesh points in a particular frame to a set of mesh points for a subsequent frame, for use in tracking objects.

In some implementations, the data is processed with a statistical filter that uses one or more of a variety of filtering approaches to respectively filter statistical components of the mesh points, such as may be relevant to the estimation of motion for a particular point or set of points, in connection with the particular combination of points and vector tracking. For instance, tracked points or collections of points can be processed for estimating a projected (tracked) position in a subsequent frame. The statistical filter may, for example, also be used to determine information such as pan, zoom and rotate information for the shape characterized by the mesh points subjected to the filter.

In various embodiments, mesh points are modified to maintain coherence, based upon characteristics of the scene in which the mesh points lie. For instance, if an identified point or feature is occluded by other objects or by itself (self-occlusion) in a particular frame, the identified point can be removed from the set of mesh points tracked for the frame. If a mesh point or a feature defined by a group of mesh points moves off screen (out of a frame), the off-screen points are rejected as unnecessary or out of scope for tracking. As these mesh points or features come back into view, they are re-established as part of the defined mesh points to be tracked. Accordingly, these approaches can be used to mitigate or eliminate a need to reset a shape area as set using a shape definition approach as discussed above.

In some applications, a shape area used to define and track objects is modified automatically relative to scene boundaries. For example, as a tracked object nears the edge of a scene, the boundary of the object is automatically modified to conform with the edge. As the object comes back into view, the boundary is increased based on a previous setting as the object moves back on screen.

In connection with certain embodiments, frame-to-frame mesh coherence is used to determine the mesh points used in tracking objects. For example and as may be implemented with related embodiments discussed above, mesh points from a previous frame can be used in a subsequent frame according to point characteristics, such as those based upon frame-to-frame consistency (or lack thereof). New points are added to a particular mesh in response to frame-to-frame inconsistency among existing points and/or a need to further define a mesh. Existing points are discarded based upon inconsistencies and/or lack of a need to include certain points to define a mesh. In some implementations, weighting values are used to assign a weight to points, based upon which maintenance/removal of the points is carried out.

If the tracking fails for a particular frame or set of frames (e.g., mesh coherence is lost), tracking is re-initiated at an appropriate point to re-establish a trackable set of mesh points. In some implementations, a new mesh is defined at a frame prior to a particular frame at which tracking failed, and mesh points are tracked by advancing through frames to the particular frame at which mesh coherence is lost (e.g., by re-initiating tracking at one or more frames prior to the particular frame). For example, the above-discussed shape definition can be re-initiated at a previous frame, several frames back from a frame in which tracking is lost (mesh coherence is lost), and the process continues in an adaptive manner.

In certain applications, a frame at which to re-initiate tracking is automatically determined. For example, a computer may use a confidence rating defined by trackability or other characteristic to select a previous frame having a desirable confidence rating to achieve. In some applications, a particular shape in the images is used as a basis for setting the confidence rating, where that shape may or may not correspond to tracked features.

In some implementations, this approach to establishing and maintaining mesh coherence is carried out as a mathematical optimization problem that employs an iterative procedure to solve the problem. In one example, apparent boundaries of a data set relating to the mesh points are constructed, and arbitrary regions that the fitting must not penetrate are defined to ensure that the fitting is appropriate (e.g., relative to the boundaries). For example, if a particular object being tracked cannot enter a particular region or go beyond a particular boundary, such regions are defined to ensure that the tracking functions do not attempt to track the object into the regions.

Determining loss of coherence at a particular frame may involve one or more different approaches that suit the particular application as relative to one or more of the type of video, desired processing or available components to carry out the processing. For instance, the loss of a predefined number of mesh points due to scene characteristics, a determined or perceived degradation in accuracy of point-based image characteristics, or a statistical-type evaluation of frame-to-frame point consistency can be used as a basis upon which to determine frame-to-frame coherence. Other characteristics, such as relative positioning of points, point coordinates, and rotational or other movement-based relative positioning of points as may be determined in connection with motion vectors can also be used as a measure of consistency.

In some applications, loss of coherence is automatically determined based upon a confidence rating assigned to a tracked portion of an image. Such a confidence rating may, for example, be applied based upon the points in a tracked portion, relative to an ability to accurately define the points relative to the same points in a previous frame and/or a number of points that are trackable between frames. When the confidence rating falls below a set limit, a loss of coherence is detected and accordingly processed.

In some embodiments, a user interface is configured to facilitate defining the mesh. The interface includes controls for determining shapes and boundaries, such as by permitting a user to define the shape and boundary directly, to select a predefined shape and boundary, or to use some sort of automated shape and boundary selection that can augment or be independent from any user-input shape and boundary selections. In certain implementations, the user interface includes controls to modify an object orientation vector, or to select/de-select individual points within a mesh as important features (such as the eyes or nose of a person in a scene).

The user interface can be implemented upon a variety of different types of devices operating upon different platforms. In some embodiments, the user interface includes a computer that executes programming functions to generate and display user interface selections to a user viewing a computer screen. The computer presents stored video information on the display, and receives user inputs, such as from a pointing device, to set mesh points, define objects, control motion characteristics of points, set processing parameters and characterize other tracking conditions as appropriate. For instance, the computer may receive a user input from a computer mouse or pen that involves selecting a region of a currently-displayed image to use in setting mesh points or related conditions, such as mesh boundaries for a particular object to be tracked.

Various embodiments as described herein may be implemented in connection with one or more types of systems. For example, approaches to detecting or otherwise identifying a portion of an image to be tracked may involve using software-based systems, such as the Open Computer Vision system (OpenCV and/or OpenCV Version 2) available from Willow Garage of Menlo Park, Calif.

Turning now to the figures, FIG. 1 shows a block diagram for particle-based tracking, according to an example embodiment of the present invention. In some implementations, the tracking approach shown in FIG. 1 is carried out using a computer-based tracking system programmed with a tracking algorithm to analyze video frames in order to estimate motion parameters and follow the motion path of one or more objects in the video. Model-based features such as wire frame and region-based features, as may pertain to points of interest on a calculated surface, region or active contours, are used in such tracking. While not so limited, the following discussion is made in the environment of such example embodiments, as applicable to tracking images in video frames of a movie clip.

Figure 2:
FIG. 2 shows an approach for particle-based tracking, according to another example embodiment of the present invention.

At block 100, a region of interest in a video frame is defined for frame-to-frame tracking. The region may include, for example, a predefined keyframe or other type of shape that may define one or more of a variety of different types of regions in a video frame, such as a person's face or an object. For example, an oval shape can be used to define a region of a scene corresponding to a person's face, such as shown in FIG. 2 and discussed below. Other predefined shapes can be used to set the boundary, or the boundary can be set with an arbitrary shape defined using a pointing device or otherwise. The region of interest can thus be defined manually, such as via user input directly or indirectly identifying a region in the video frame. The region of interest can also be defined automatically, such as by using computer-driven object identification or recognition.

At block 110, feature points from within the defined region are identified to form a particle mesh, which generally follows an outline or boundary of a feature to be tracked. At block 120, the mesh ballistics are calculated, determining respective motion vectors applicable to particles in the mesh (and, correspondingly, to the mesh and tracked object as a whole).

At block 130, the defined mesh is propagated (e.g., transformed) to an adjacent frame using the determined motion vectors of the identified points in the mesh to form a coarse boundary in the adjacent frame (e.g., a next/previous frame, depending upon the video direction). At block 140, occlusion and scene boundaries are detected and used to modify (if appropriate) one or more mesh points to maintain mesh coherence, such as by dropping points occluded by a boundary or via rotation or other characteristics of the object being tracked, or by adding mesh points for new points now within the defined region of interest, such as within an oval or other shape used at block 100.

After selective point modification at block 140, the mesh is tested at block 150 to determine a mesh coherence condition (e.g., a number of points that are maintained and/or trackability of an object). At block 160, if the determined coherence condition is indicative of or otherwise satisfies mesh coherence conditions, mesh points for the next (aforesaid adjacent) frame are set at block 170, based upon existing points and, where appropriate, adding or removing points. The process then continues at block 120 with the adjacent frame, again computing mesh ballistics and continuing on to propagating the mesh to a next subsequent frame.

If the determined coherence condition indicates loss of mesh coherence at block 160 (e.g., characteristics of the points fail to satisfy a condition), the tracking is reset at block 180 to a previous frame in a sequence of frames that are prior to the frame in which coherence is lost. Depending upon the direction of the tracking (e.g., forward motion or reverse motion), the "previous" frame is relative to the directional position, such that a previous frame when tracking through a video in reverse sequence is actually a frame from a latter portion of the video. The tracking process is then re-initiated from the reset frame at block 110, by determining mesh points for the shape defined at block 100. In this context, the process continues throughout a video sequence, based upon the ability of the system to maintain coherence using a determined set of mesh points (and as may be modified via occlusion/boundary conditions), and re-sets mesh points when coherence is lost.

FIG. 2 shows an approach 200 for particle-based tracking in a video scene showing two individuals, according to another example embodiment of the present invention. The image in FIG. 2 represents a user display showing a video frame in which features are tracked. In this instance, the face of a person in the scene is tracked using an oval-type boundary 210 (and, e.g. 240). Features to be tracked are identified within the boundary 210 using a variety of mesh points, with mesh point 220 referenced by way of example. In this example, features to be identified include eyes, nose, mouth, chin and edges of the face. The ballistics of the identified features are computed and used to track the features from frame to frame.

Other characteristics of the scene, such as boundary 230, are also referenced and used in tracking features from frame to frame as any mesh points are blocked. In some implementations, a user operating the system as represented in FIG. 2 is prompted to define an object before the object moves off screen, when the object reaches such a boundary. In this example, the face in the boundary 210 is shown near the edge of the screen. As such, the system may be programmed to automatically recognize the boundary location and prompt a user to identify objects within the boundary before they move off screen.

In other implementations, objects for which no boundary has been identified yet moving off screen or into occlusion can be similarly detected, with a user prompted to identify the object or objects. Such user-identification may, for example, involve defining hard keyframes at the beginning and end of a series of frames, or time segments, where the object cannot be seen. For instance, when an object enters a scene, and then later leaves a scene, hard keyframes can be set at frames corresponding to the entry and exit of the object, facilitating the tracking of the object during its presence in the scene, while tracking of the object is not carried out when the object is not in the scene. Where an object returns to a scene, previously-defined tracking points may again be used, or a new set of points can be developed, to suit different applications.

In many applications, an arrow or other type of symbol is used and/or assigned to mesh points to assign motion-related characteristics of the points as pertaining to one or more of direction, velocity and acceleration.

Figure 3:
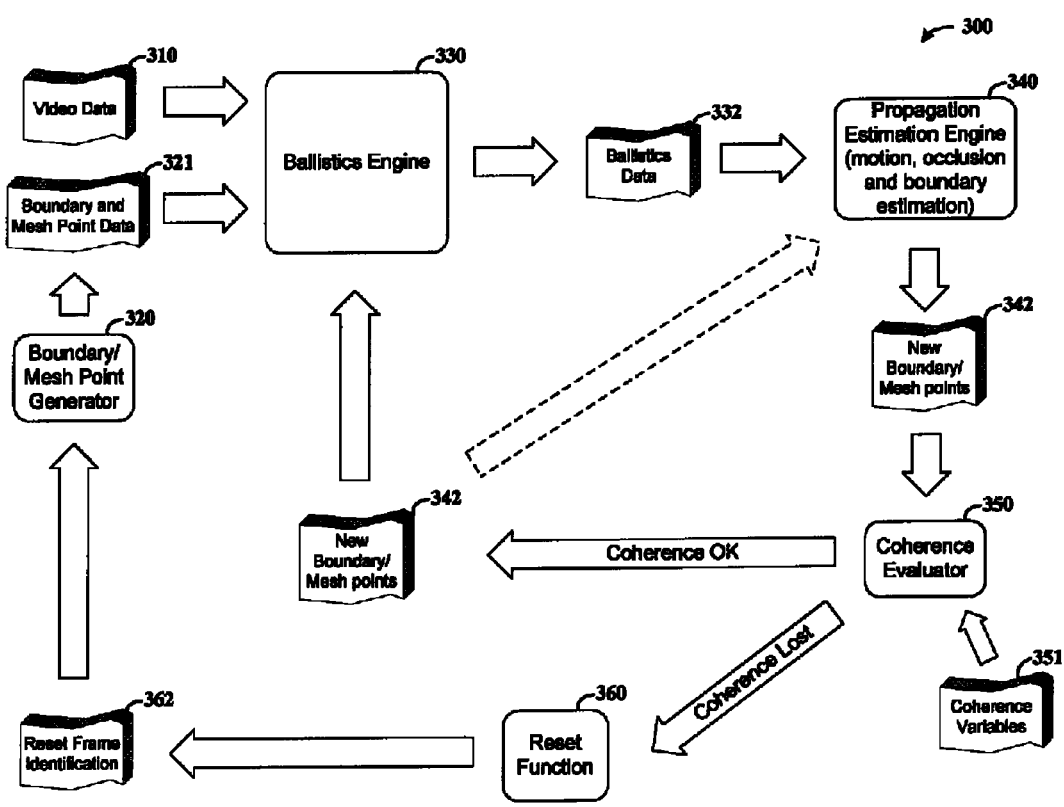
FIG. 3 shows a system for particle-based tracking, according to another example embodiment of the present invention.

FIG. 3 shows a system 300 for particle-based tracking, according to another example embodiment of the present invention. One or more aspects of the system 300 may, for example, be implemented with a computer processor circuit (e.g., a CPU), an application-specific processor circuit, or a collection of such circuits. In addition, one or more components of the system 300 can be integrated into a single component that carries out the respective functionality of the combined components. Generally, the system 300 receives and processes video data 310 for tracking objects from frame to frame.

A boundary/mesh point generator 320 generates boundary and mesh point data 321, using information in the video data 310 and/or user inputs defining features to be tracked. In many implementations, the mesh point data 321 is generated based upon user inputs collected by a user interface, which can be carried out in a manner consistent with that described in FIG. 2.

A ballistics engine 330 receives the video data 310 and the mesh point data 321, and uses this received data to generate ballistics data 332 that can be used to estimate movement of the mesh point data 321 from frame-to-frame. This ballistics data 332 may, for example, include processing parameters, code and/or an algorithm-type of data that can be used to estimate motion for propagating boundary/mesh points throughout a scene.

A propagation estimation engine 340 uses the ballistics data 332 to generate new boundary/mesh points 342 for a subsequent frame in the video data. A coherence evaluator 350 evaluates the new boundary/mesh points 342 for coherence, using coherence variables 351 as an input, to estimate a coherence condition of the mesh points (e.g., as discussed above, such as relative to boundaries and occlusion).

If the coherence evaluator 350 determines that the new boundary/mesh points 342 are coherent, these new boundary/mesh points 342 are passed back to the ballistics engine 330 for use in generating new ballistics data 332 for propagating the new boundary/mesh points 342 to another subsequent frame. In some instances, the ballistics data 332 is maintained and the new boundary/mesh points 342 are provided to the propagation estimation engine 340, which uses a previous set of ballistics data 332 to propagate the new boundary/mesh points 342 to another frame. In this context, an image corresponding to image data within the mesh is transformed from frame to frame, in which the transformed image is that which is in the propagated mesh.

If the coherence evaluator 350 determines that coherence has been lost, a reset function 360 generates a reset frame indicator 362, which is passed to the boundary/mesh point generator 320 to effect a reset and the generation of a new set of boundary/mesh points. This reset may, for example, involve generating a new set of boundary/mesh points based upon a previous video frame (e.g., one or more video frames before from a current frame in which coherence was determined to be lost).

For each iterative generation of boundary/mesh points, the tracked video data as corresponding to these points can be selectively output for a variety of uses, such as for adding special effects or otherwise modifying the video data 310. For example, when an object such as a human face is tracked in a scene, image data modification that is tailored to the person's face can be carried out upon pixels in the tracked mesh, ensuring that the image data modification follows through the scenes.

The above-discussed approaches may be carried out to effect tracking in a multitude of disparate applications. The following use-case type discussion of exemplary embodiments may be carried out using one or more of the systems, components and approaches as discussed above.

In accordance with various example embodiments, video clip data is tracked for use in modifying the data in a host application. A user input device is configured to receive user inputs for setting at least one keyframe that locates a mask shape around an object to be tracked in a scene of the video clip. In certain applications, as an alternative or in addition to such user input, keyframes are automatically determined based upon characteristics of an image (e.g., using face recognition to identify a face in a scene). If the tracked object is obscured or goes off-frame, keyframes may be placed at the start and end of the time segments in which the object is not trackable in the scene (e.g., via user input or as part of an iterative tracking process that automatically determines obscurities/off-frame movement). Keyframes placed and/or modified by a user can be tagged as "hard keyframes" and displayed in a user-accessible keyframe list.

Keyframes can be set in a variety of manners. In some implementations, each keyframe is adjusted so that the mask completely surrounds the area to be tracked, to facilitate manipulation of the video data in the tracked mask region (e.g., for later effects application). An inset portion of the mask is then set to include a central area of the tracked object without background. Accordingly, the keyframe itself is somewhat larger than the object/area to be tracked, while the inset more accurately identifies the object within the scene, relative to any background or other objects. For example, a keyframe mask can be set to completely surround an actor's head, while the inset is limited to the actor's face.

Clip segments between keyframes, or between a keyframe and the start or end of a clip, referred to here as "spans," can be processed separately from other spans. In connection with various embodiments, spans that can't be tracked (e.g., because of an obscuration) are marked as un-trackable. Individual spans or all spans can be tracked based upon user input selections indicating the same. Soft keyframes are used to animate the mask to follow the tracked object within spans, and can be used as an ancillary input relative to main tracking parameters (e.g., relative to hard keyframes). Keyframes can be adjusted to obtain better tracking if there is a problem, and updated spans can be re-tracked. In some implementations, the soft keyframes are automatically updated (e.g., overwritten) by the system, whereas the hard keyframes placed by the user are protected from such action. The soft keyframes can be converted into hard keyframes via editing them, or by explicitly placing a hard keyframe at the location of a soft keyframe. This can be done via user input, or automatically based upon certain conditions (e.g., by determining that a keyframe represents a scene or occlusion boundary for a particular span).

Once the tracking has been satisfactorily completed (e.g., the position of an object has been tracked throughout a span or scene), the animated mask as defined by the tracked position throughout several frames can be used to mask the application of any suitable effect, such as a blur or a lightening. This masked application can be used to effectively mask the tracked object from any such effects, or to apply affects to the tracked object (or objects) and mask other portions of the scene.

Spans are tracked to suit various needs, in accordance with different example embodiments, and relative to keyframe positions at one or both ends of a clip, or to a beginning or end of a clip. If the span is open at one end, the tracking is begun at the bounding keyframe (the other end), using the information available about the object location. Overlapping frame pairs are passed for tracking, either forward or reverse in time, depending on the location of the open span end.

For instance, if the span is open at the beginning, tracking is carried out from the end of the clip back to the beginning, using the keyframe at the end as a starting point. New mask parameters are created for the second frame of each pair of frames as the tracking is carried out from frame to frame, which causes the mask to animate so as to follow the object from frame to frame. Accordingly, each frame pair is tracked based upon the tracking of the previous frame pair. If the tracking quality falls below a minimum, such as relative to a number of preserved points and other characteristics as discussed above (e.g., obscuration or an object leaving the frame), tracking is halted. Once the track has completed, the resulting animation parameters for the mask, as defined by the frame-to-frame tracking of the mask are converted into soft keyframes.

If there are keyframes at both ends of a span, the tracking can be carried out from both ends of the span, heading towards the other end, one going forward in time and one going in reverse. Once tracking is completed in both directions, two resulting sets of animation parameters at each frame are combined using a weighted average, and soft keyframes are set at those locations.

Frame pairs are tracked using one or more of a variety of approaches, some of which may involve one or more aspects of tracking as in the OpenCV product referenced above. In one embodiment, two image frames (Frame 1 and Frame 2) are presented for tracking. Frame 1 may occur either before or after Frame 2, and the frames need not be adjacent in a video clip (e.g., two frames that are separated by other frames can be tracked to skip over an occlusion in an intervening frame). A mask shape is provided to focus upon the object inside the mask. A list of suitable features is created for subsequent tracking. Such suitable features may, for example, include features that lie inside of the mask, aren't too close together, and mark what amount to corners (high eigenvalues) in the image, and the list of such features can be regenerated for each Frame 1 of the pair. The movement of the features from Frame 1 to Frame 2 is determined and used to create a set of point pairs, indicating the location of each feature in Frame 1 and Frame 2. The point pairs are used to calculate a rigid 2D transform for the object being tracked and to produce rotation, x and y scale, and x and y translation for the object. The 2D transform is applied to the Frame 1 mask shape, producing a new mask shape for Frame 2.

Frame pairs are prepared using monochrome images so the frames are converted to monochrome before any processing occurs on them. The mask inset shape (e.g., a rectangle or an ellipse) is rasterized to produce a bitmap mask distinguishing the inside from the outside of the mask, and the bitmap mask is used to limit the selection of features to the inside of the mask inset shape. A feature list is made from features found only in Frame 1, and from what can be a predefined or otherwise limited number of features (e.g., an upper limit of 200 features). The distance between selected features can vary depending upon the application. In some implementations, the distance is maintained at a minimum of about 5 pixels, or of about 3 pixels (e.g., when the mask covers 100 pixels or fewer). In addition, a minimum number of detected features can be set as a determination as to whether tracking can be carried out (e.g., the detection of 8 or fewer features can be used to cancel tracking).

An optical flow approach is used to find each tracked feature's location in Frame 2, such as by using a sparse iterative version of the Lucas-Kanade optical flow using image pyramids, such as described in Jean-Yves Bouguet, *Pyramidal Implementation of the Lucas Kanade Feature Tracker Description of the Algorithm*, Intel Corporation Microprocessor Research Labs (2000), which is fully incorporated herein by reference. For the second and subsequent frame pairs in a span, the transform calculated by the previous frame pair is used to generate a guess for the positions of the features in Frame 2, which can enhance accuracy and permit the use of a relatively smaller search window. The location, in Frame 2, of a feature from Frame 1 is searched within a window centered on a predicted location of that feature, where the predicted location is based on the previous frame pair transform (if there is one).

Larger window sizes generally require greater processing power, yet too small of a window size may result in lost or misrecognized features; thus, the window size can be tailored to a particular application (e.g., between about 7 and 25 pixels in size), and can be set using a trial-and-error type of approach. Accordingly, the window size can be dynamically adjusted to facilitate (e.g., maximize) efficiency and accuracy.

If the derived transform is of low quality, due to issues such as too few points found in Frame 2, or output points that produce a low-accuracy transform, the window is automatically enlarged and an optical flow determination is repeated. If the transform produced is very high quality, the window size is reduced for the next frame pair. The window size adjustment can be made in cycles, with a limit in number of cycles selectively set to accommodate expected failures (e.g., if growing a window four times has not generated a positive result, the process can be terminated or reset, as described above, such as by growing the window to about 150% of its previous size in each cycle, or shrinking the window to about 80% of the previous size). After the optical flow finished for the frames, points from Frame 1 that were not found in Frame 2 are removed from the point set, and the remaining point set is called the Feature Flow, as discussed further below.

A 2D Transform is derived from the Feature Flow as follows. Point pairs are randomly selected to form triangles, including one triangle in Frame 1 and one triangle in Frame 2. If there are 10 or fewer point pairs, all point pairs are used. If there are more than 10 point pairs, a random selection of the pairs without replacement is used. Triangles are rejected if their points in Frame 1 are close to collinear or if two of the points are too close together, to mitigate issues with an equation solver failing with a zero determinate. Triangles are also rejected if the distance between the points in each pair is more than twice the average distance, to eliminate bad point trackings that can produce point pairs that are very different than others in the set.

A non-iterative (flattened) linear equation solver is used to calculate the affine transform that would transform the Frame 1 triangle into the Frame 2 triangle. Each transform is used to calculate an average result triangle by transforming a unit triangle and averaging the corresponding vertex positions of the resultant triangles. Each transform is used again to transform a unit triangle, from which a scalar distance from the average triangle is calculated. These distances are accumulated and a standard deviation is calculated from the result. Each transform is again used on a unit triangle as before, and those transforms whose distance from the average is more than ½ standard deviation are rejected. If there aren't very many transforms, the limit is 1 standard deviation. This filtering of transforms (rejecting outliers) is repeated until there are fewer than a set number of transforms left (e.g., 110 transforms, or ½ of the number of triangles that can be produced by 12 points). The remaining transforms are used as above to calculate an average transformed unit triangle, and then a final transform is derived from that triangle. In other approaches, the transforms are averaged to generate an affine transform. This process may occur iteratively with the optical flow calculation while increasing the optical flow window size.

The transform produced by the previous step is converted into separate rotation, scale, and translation components using a polar decomposition, and the separate components are used to animate the mask shape from Frame 1 to Frame 2. Each of the components corresponds to an animatable parameter used to animate the mask from frame to frame. In addition to the mask animation, a quality measure is produced and stored. This measure is based on the number of tracked features and the proportion of features from Frame 1 that were found in Frame 2.

Bidirectional tracks are combined as follows. When tracking spans that have keyframes at both ends, separate trackings are performed from the first to the last frame of the span, and from the last to the first frame (as discussed above), with the separate trackings occurring in parallel as desired. When tracking multiple spans using the Track All button, all spans can be tracked in parallel. These trackings produce lists of mask parameters, the same information as in keyframes. Each item on the list also contains a quality measure, relative to one or more conditions as discussed above. A soft keyframe is produced from the two tracking lists with a weighted average of the two directions, with the weighting being a combination of distance from the start of the track and the quality metric. The closer a track item is to its starting keyframe, the more weight it's given. Similarly, a track item having a higher quality is weighted more highly.

The following discussion references various other example embodiments and implementations, some of which may be implemented in connection with the approaches and/or systems as shown in the Figures and/or otherwise described above.

According to another example embodiment, a multi-dimensional image processing approach involves presenting objects in a manner that implies or otherwise represents depth to a viewer. In one implementation, two-dimensional (2-D) transforms are used to interpolate, with position estimation, scaling, rotation and skewing across one or more points. When a key frame is injected, interpolation is carried out across a set of key frames to mitigate or eliminate incorrect deformation. For example, an image portion representing a side of a human face is tracked in a scene, and the side can be deformed so that it looks smaller (depending upon the movement of the face), to emulate 3-D imaging.

In another implementation, full 3-D rotational data is processed, using a 3D model for a region of a scene such as a human head over an object definition. In this case, individual key features are identified and tracked over a range of deformation that may be greater, relative to 2-D data. For instance, a 3D model can be created of a human head for a particular video sequence, using images from the head from different perspectives and/or an estimation scheme(s). As the head rotates or otherwise moves in successive video frames, objects are tracked in three dimensions, which accordingly involves certain relative deformation and/or self-occlusion that is processed in accordance with the defined 3D model. As tracked objects rotate, points within a mesh used to define the objects move relative to one another in accordance with the rotation. These characteristics are used to track the three-dimensional positioning of the tracked object (s).

Another example embodiment is directed to tracking small objects, such as an earring on a person's ear (e.g., only four pixels or so), using a point-based system. A set of points is defined for the ear and tracked from frame-to-frame. In some applications, when an object tracked using such a point-based approach grows larger in a view or scene, as may occur when panning into an extreme close-up view, a mesh-based tracking approach is initiated and used to take over the tracking, where a series of mesh points are used to define and track the mesh.

In another example embodiment, multiple objects are tracked in the same system and same frame. One or more of the above tracking approaches may be carried out for different objects, and for controlling multiple mesh-based (or point-based) tracking functions. This approach may be amenable, for example, for tracking two faces in a scene, where a mesh is defined and tracked for each face. For example, referring again to FIG. 2, boundary 240, similar to boundary 210, can be used to track the other individual in the scene. Features to be tracked (such as eyes, chin) are identified via mesh points and used in tracking the face. In some implementations, interactions between two different tracked objects are detected and tracked, such as by tracking objects using separate meshes when the objects are apart, and using a single mesh when the objects come together. This approach is amenable, for example, to tracking the faces of two people that interact (e.g., kiss) by controlling the joining and separation of the two faces through mutual collision and occlusion of certain points in the respective meshes, such as described above in which boundaries 210 and 240 join and/or points are occluded.

Another example embodiment is directed to detecting and communicating an indication of a quality of data (e.g., coherence) for a user to observe. When the scene is close to losing mesh coherence, user inputs are processed and used, such as to add a keyframe or reset mesh determination, or to modify shape definition. For instance, an additional keyframe may be added when changes to the keyframe become significant from frame to frame, relative to a keyframe from which subsequent frames extend. These approaches may be carried out in addition to the aforesaid frame-based approach involving reversion to an earlier frame with new mesh determination, such as described in connection with FIG. 1.

In another example embodiment, image data is merged with image data that is created or otherwise presented to achieve one or more effects. In one implementation, objects are dynamically modified, such as to make the objects thinner or to re-light the objects to increase brightness. In these contexts, mask data that describes the area is generated along with other data, such as point or motion path data, to vary other settings. For instance, a glint can be created upon the lips of a face that is being tracked in a scene by adding a starburst or other type of filter to a pre-defined point of interest characterizing the lips.

In another example embodiment, one or more of the above-discussed object tracking embodiments and implementations is implemented with an MPEG-4 type of VOP (video object plane) processing. For example, static mosaics can be tracked to achieve desirable compression, using a tracking approach as described herein to detect and track persistent objects. Such an approach may involve, for example, tracking mosaics that are generally unchanged from frame to frame, by re-using compressed data pertaining to the majority of the mosaic and modifying/processing that data which changes from frame to frame in a different manner. By tracking these mosaics, compression can be increased, such as by recognizing the repetitiveness of portions of the static mosaic in iterative frames (e.g., as may be processed in accordance with MPEG-7 processing approaches).

In a more particular embodiment, a point-cloud fitting system is used to assign a mesh to represent the video object, to describe the motion of the object by the displacements of node points in the mesh, and to describe intensity variations via contrast and brightness parameters estimated for each node point. Using the temporal history of the node point locations, the nodes of the 2-D mesh are tracked when they become invisible (e.g., due to self-occlusion, occlusion by another object or boundary collision). When coherence fails, an adaptive computation is carried out to re-compute a mesh for maintaining coherence through the failure point. In such applications, a final object/mesh may look completely unlike an initial object/mesh, but coherence is maintained through the frame-by-frame modifications used to achieve coherence. This approach may be implemented, for example, in connection with the approach shown in FIG. 2, in which objects in the boundary 210 are occluded when objects in the boundary 240 move to mask the objects in boundary 210.

While certain aspects of the present invention have been described with reference to several particular example embodiments, those skilled in the art will recognize that many changes may be made thereto without departing from the spirit and scope of the present invention. For instance, one or more approaches as described herein may be computer-implemented or computer-assisted, as by being coded as software within any coding system as memory-based instructions executed by a microprocessor, PC or mainframe computer, or may be implemented in hardware such as a state machine, or programmed into a circuit such as a field-programmable gate array. Certain portions of the processing approaches described herein may be carried out using systems and processors, and such systems and processors executing software such as After Effects available from Adobe of San Jose, Calif. In addition, the various methods and computer-circuit based approaches as described herein may be implemented with a non-transitory computer-readable medium (e.g., memory or other storage device), that stores instructions that, when executed by a computer processor, cause the processor to carry out the steps. Aspects of the present invention are set forth in the following claims.

What is claimed is:

1. A system for processing video data, the system comprising:
    a logic circuit configured to process a series of sequentially-ordered video frames in a set of video data, by
        defining a region of interest in an initial one of the video frames,
        generating a particle mesh from a set of feature points for an object in the defined region, propagating the particle mesh to an adjacent video frame using motion vectors of points in the mesh to determine a coarse boundary at the adjacent frame, detecting a condition of occlusion and scene boundaries in the adjacent video frame based upon the position of the determined coarse boundary, and using the detected condition of occlusion and scene boundaries to set a boundary and a number of feature points within the coarse boundary in the adjacent video frame, to maintain mesh coherence and track the object in the adjacent video frame.

2. The system of claim 1, wherein the logic circuit is further configured to test the particle mesh in the adjacent video frame to determine whether coherence fails, based upon a number of the feature points that are maintained in the propagated mesh, and in response to determining that the coherence fails, repeating the steps of defining, forming, propagating, detecting and using with a new region of interest in one of the video frames that is prior to the initial frame in sequence.

3. The system of claim 1, wherein the logic circuit is configured to propagate the particle mesh by analyzing adjacent video frames to estimate motion characteristics of the feature points within the particle mesh, and using the estimated motion characteristics to generate the motion vectors.

4. The system of claim 1, wherein the logic circuit is configured to generate the particle mesh from a set of feature points for an object in the defined region by determining points defining the particle mesh using a set of feature points including at least one of: model-based features, wire frame features, region-based features, and points of interest on a calculated surface, region or active contours.

5. The system of claim 1, wherein the logic circuit is configured to automatically define the region of interest around an object identified using image characteristics of the initial video frame.

6. The system of claim 1, wherein the series of sequentially-ordered video frames includes a plurality of consecutive frames, and the logic circuit is configured to carry out the steps of propagating, detecting and using to propagate the particle mesh through the plurality of consecutive frames, and test the particle mesh in the consecutive frames to determine whether coherence fails, based upon a number of feature points maintained in the propagated mesh throughout the plurality of consecutive frames.

7. The system of claim 1, wherein the series of sequentially-ordered video frames includes a plurality of consecutive frames, and the logic circuit is configured to carry out the steps of propagating, detecting and using to propagate the particle mesh through the plurality of consecutive frames, test the particle mesh in the consecutive frames to determine whether coherence fails, based upon a number of feature points maintained in the propagated mesh throughout the plurality of consecutive frames, and in response to determining that coherence does not fail, use the propagated particle mesh to track an object in the consecutive frames, and apply a video effect to the tracked object in each of the plurality of consecutive frames by modifying data representing the tracked object in each of the plurality of consecutive frames.

8. The system of claim 1, wherein the logic circuit is configured to define a region of interest by defining a set of points bounding the region of interest for the initial frame and an end frame in the sequentially-ordered video frames, and carry out the steps of propagating, detecting and using to propagate the particle mesh through a sequence of the frames beginning at the initial frame sequentially through the end frame, using the defined set of points in the initial and end frames to set the beginning and end of the propagated particle mesh, to set a boundary and number of feature points within the coarse boundaries in each of the video frames in the sequence.

9. The system of claim 1, wherein the logic circuit is configured to define a region of interest by defining a set of points bounding the region of interest for the initial frame and an end frame in the sequentially-ordered video frames, carry out the steps of propagating, detecting and using to propagate the particle mesh through a forward-sequence of the frames beginning at the initial frame sequentially through the end frame, and to propagate the particle mesh through a reverse-sequence of frames beginning at the end frame sequentially through the initial frame, using the defined set of points in the initial and end frames to set the beginning and end of the propagated particle mesh, and set a boundary and number of feature points within the coarse boundaries in each of the video frames in the sequence based upon the propagated particle mesh in both the forward-sequence of frames and the reverse-sequence of frames.

10. The system of claim 1, wherein the logic circuit is configured to define a region of interest by defining a set of points bounding the region of interest for the initial frame and an end frame in the sequentially-ordered video frames, carry out the steps of propagating, detecting and using to propagate the particle mesh through a forward-sequence of the frames beginning at the initial frame sequentially through the end frame, and to propagate the particle mesh through a reverse-sequence of frames beginning at the end frame sequentially through the initial frame, using the defined set of points in the initial and end frames to set the beginning and end of the propagated particle mesh, weigh the particle meshes in each frame based upon at least one of comparison between the mesh and the defined set of points in the initial frame in the sequence and a quality of the mesh based upon mesh coherence, combine the weighted meshes for each frame, and set a boundary and number of feature points within the coarse boundaries in each of the video frames in the sequence based upon the combined meshes.

11. The system of claim 1, wherein the logic circuit is configured to define a region of interest by defining a set of points bounding the region of interest in response to user inputs received from a user input device.

12. The system of claim 1, wherein the logic circuit is configured to define a region of interest by defining a set of points bounding the region of interest and a set of points bounding an inset portion of the region of interest, the inset portion more specifically defining a feature in the video frames to be tracked.

13. The system of claim 1, wherein the logic circuit is configured to define a region of interest by selecting points having high eigenvalues, relative to other points, to define a boundary of the region of interest.

14. The system of claim 1, wherein the logic circuit is configured to define a region of interest iteratively for a plurality of the video frames by dynamically adjusting the size of the region of interest based upon a degree of mesh coherence.

15. A system for tracking objects in a series of video frames, the system comprising:
   a user interface circuit configured to receive user inputs for defining a region of interest in an image represented by a first one of the video frames; and
   a logic circuit configured to
      generate a particle mesh from a set of feature points for the defined region of interest in the first one of the video frames, calculate a transformation function for propagating the mesh to a temporally-adjacent one of the video frames using motion vectors for the feature points, and propagate the particle mesh from the first video frame to the temporally-adjacent video frame,
      for each subsequent pair of temporally-adjacent video frames, use a transformation function calculated for a temporally-previous pair of video frames to propagate a particle mesh from a first one of the pair of video frames to a second one of the pair of video frames, and calculate a transformation function for propagating the mesh from the first one of the pair of video frames to the second one of the pair of video frames,
      test the propagated mesh for coherence based upon the number of the feature points maintained in the propagated mesh throughout each video frame, and
      in response to determining that the propagated mesh is coherent, use the propagated mesh to apply a video effect to video data in a region defined by the mesh in each of the video frames.

16. The system of claim 15, wherein the logic circuit is configured to calculate each transformation function by, for each pair of frames from which the transformation function is calculated,
   randomly selecting point pairs in each frame to form sets of triangles for each of the frames,
   for each set of triangles, using a linear equation solver to calculate an affine transform that would transform a first one of the triangles into a second one of the triangles,
   transforming a unit triangle using each calculated affine transform to generate an average result triangle for each transform, and averaging corresponding vertex positions of the average result triangles,
   transforming a unit triangle using each calculated affine transform, calculating a scalar distance from each of the unit triangles to the average result triangle, and calculating a standard deviation of the unit triangles from the result,
   transforming a unit triangle using each calculated affine transform, and rejecting triangles whose distance from the average is more than ½ the calculated standard deviation,
   repeating the transforming steps with remaining non-rejected triangles until fewer than a threshold number of transforms remain,
   using the remaining transforms to calculate an average transformed unit triangle, and
   deriving a final transform from the average transformed unit triangle, and using the final transform as the transformation function for the pair of frames.

17. The system of claim 16, wherein the logic circuit is configured to reject ones of the sets of triangles in response to at least one of: the points being collinear or the points being closer than a predefined minimum space, and the distance between the points in each pair being more than twice the average distance between the points.

18. The system of claim 15, wherein the feature points for the defined region of interest are set for a single video frame at a temporal end of the series of video frames, and wherein the logic circuit is configured to use the transformation function to generate the particle mesh for every frame of the series of video frames, beginning with a predefined keyframe as the first one of the video frames and extending to the video frame at the temporal end of the series of video frames.

19. A system for tracking objects in a series of video frames, the system comprising:
   a user interface circuit configured to receive user inputs for defining a region of interest in first and last keyframe images in the series of video frames; and
   a logic circuit configured to,
      for each of the first and last keyframe images,
         form a particle mesh from a set of feature points for the defined region of interest, calculate a transformation function for propagating the mesh to a temporally-adjacent one of the video frames using motion vectors for the feature points, and propagate the particle mesh from the keyframe images to the temporally-adjacent video frame,
         for subsequent pairs of temporally-adjacent video frames in a temporal direction towards the other of the first and last keyframe images, use a transformation function calculated for a temporally-previous pair of video frames to propagate a particle mesh from a first one of the pair of video frames to a second one of the pair of video frames, and calculate a transformation function for propagating the mesh from the first one of the pair of video frames to the second one of the pair of video frames,
      combine the propagated particle mesh for the video frames generated from each of the keyframe images,
      test the combined propagated mesh for coherence based upon the number of the feature points maintained in the propagated mesh throughout each video frame, and
      in response to determining that the combined propagated mesh is coherent, use the propagated mesh to apply a video effect to video data in a region defined by the mesh in each of the video frames, by modifying the video data to which the video effect is to be applied.

20. A method for processing video data, the method comprising:
   in a logic circuit, processing a series of sequentially-ordered video frames in a set of video data, by
      defining a region of interest in an initial one of the video frames,
      generating a particle mesh from a set of feature points for an object in the defined region, propagating the particle mesh to an adjacent video frame using motion vectors of points in the mesh to determine a coarse boundary at the adjacent frame, detecting a condition of occlusion and scene boundaries in the adjacent video frame based upon the position of the determined coarse boundary, and using the detected condition of occlusion and scene boundaries to set a boundary and a number of feature points within the coarse boundary in the adjacent video frame, to maintain mesh coherence and track the object in the adjacent video frame.

21. A non-transitory computer readable medium including program instructions that, when executed by a computer processor, cause the processor to process a series of sequentially-ordered video frames in a set of video data, by performing the steps of:

defining a region of interest in an initial one of the video frames;

generating a particle mesh from a set of feature points for an object in the defined region;

transforming the generated particle mesh by propagating the particle mesh to an adjacent video frame using motion vectors of points in the mesh to determine a coarse boundary at the adjacent frame;

detecting a condition of occlusion and scene boundaries in the adjacent video frame based upon the position of the determined coarse boundary; and using the detected condition of occlusion and scene boundaries to set a boundary and a number of feature points within the coarse boundary in the adjacent video frame, to maintain mesh coherence and track the object in the adjacent video frame.

* * * * *